(12) United States Patent
Mrstik

(10) Patent No.: US 8,654,016 B2
(45) Date of Patent: Feb. 18, 2014

(54) METHODS AND APPARATUS FOR DETERMINING PARAMETERS OF AN ARRAY

(71) Applicant: Raytheon Company, Waltham, MA (US)

(72) Inventor: A. Vince Mrstik, Santa Barbara, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 13/669,331

(22) Filed: Nov. 5, 2012

(65) Prior Publication Data

US 2013/0063315 A1    Mar. 14, 2013

Related U.S. Application Data

(62) Division of application No. 12/660,227, filed on Feb. 23, 2010, now Pat. No. 8,330,662.

(51) Int. Cl.
*G01R 29/10* (2006.01)

(52) U.S. Cl.
USPC ..................................................... 343/703

(58) Field of Classification Search
USPC ................ 342/371, 357.23; 455/11.1, 24, 63; 343/703, 797
See application file for complete search history.

(56) References Cited

U.S. PATENT DOCUMENTS 4,994,813 A     2/1991  Shiramatsu et al.
5,113,193 A *   5/1992  Powell et al. ................. 342/25 F (Continued)

FOREIGN PATENT DOCUMENTS

JP          54 043657           4/1979
WO      WO 2007/039772 A1      4/2007

OTHER PUBLICATIONS

Optimal Baseline Design and Error Compensation for Bistatic Spaceborn InSAR, Fringe ATSR Workshop 2005, Nov. 25-Dec. 2, 2005.*

(Continued)

*Primary Examiner* — Huedung Mancuso
(74) *Attorney, Agent, or Firm* — Christie, Parker & Hale, LLP

(57) ABSTRACT

Methods and apparatus for determining parameters for an array are described. An exemplary embodiment of a method determines a set of parameters for an antenna array including multiple array elements, the array being fed by a feed array including a plurality of feed elements. The embodiment of the method includes measuring a plurality of bistatic ranges $R_{ijk}$ through different signal path combinations, each signal path combination from a feed element "i," to an array element "j," and to a feed element "k". The measuring includes radiating energy from feed element "i", and reflecting some of the radiated energy from array element "j" back to feed element k of the feed array. The measured bistatic ranges are processed to solve for the set of parameters. Another embodiment of a method is for measurement of multiple array elements of an array, and includes radiating energy from one or more array elements, reflecting some of the radiated energy from a set of reflector elements back to the array elements each reflector element having a variable phase shifter associated therewith, cycling each reflector element phase shifter through a range of phase shifter settings at a unique rate, processing the received signals to extract a phase of the reflected energy as received at each element; and using the extracted phase for each element to determine a relative location of each array element.

15 Claims, 5 Drawing Sheets

(56) References Cited

U.S. PATENT DOCUMENTS

| | | | |
|---|---|---|---|
| 5,140,333 A | 8/1992 | Parker | |
| 6,097,332 A * | 8/2000 | Crosby, II | 342/72 |
| 6,351,247 B1 | 2/2002 | Linstrom et al. | |
| 6,934,511 B1 | 8/2005 | Lovinggood et al. | |
| 6,954,173 B2 | 10/2005 | Mrstik | |
| 7,440,766 B1 * | 10/2008 | Tuovinen et al. | 455/506 |
| 7,830,304 B2 | 11/2010 | Mattos | |
| 2004/0075605 A1 * | 4/2004 | Bradford et al. | 342/95 |
| 2005/0001760 A1 | 1/2005 | Mrstik | |
| 2005/0237236 A1 * | 10/2005 | Budic | 342/159 |

OTHER PUBLICATIONS

Extended European Search Report for European Application No. 11155587.6, Applicant Raytheon Company, European Search Report dated May 24, 2011 and mailed May 31, 2011 (5 pgs.).

* cited by examiner

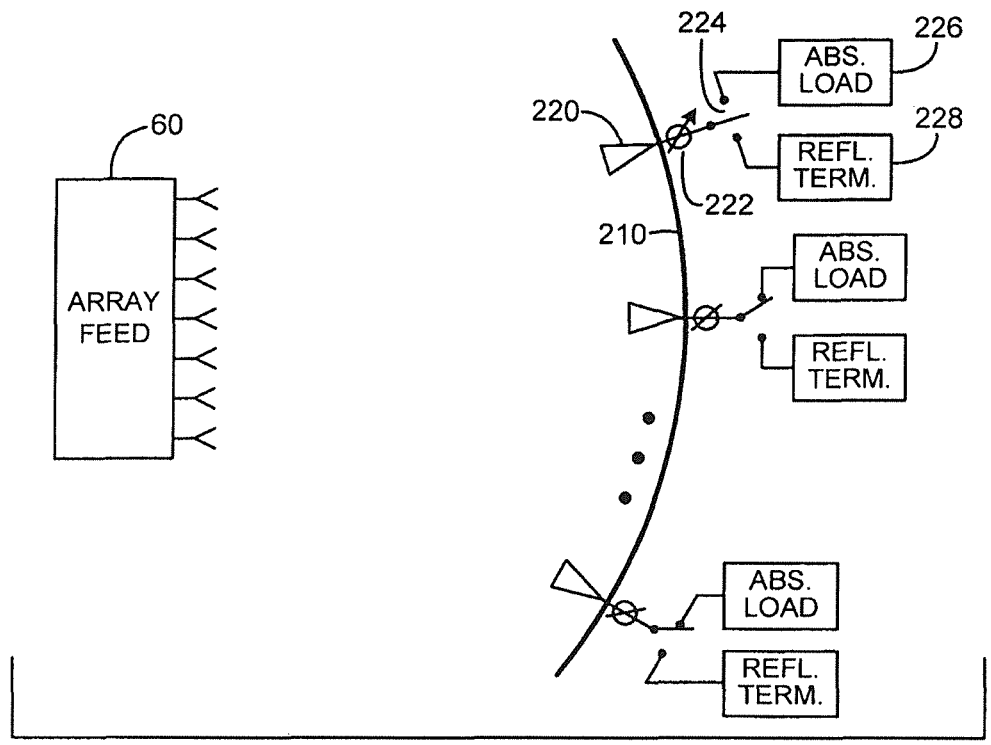
FIG. 5
FIG. 6
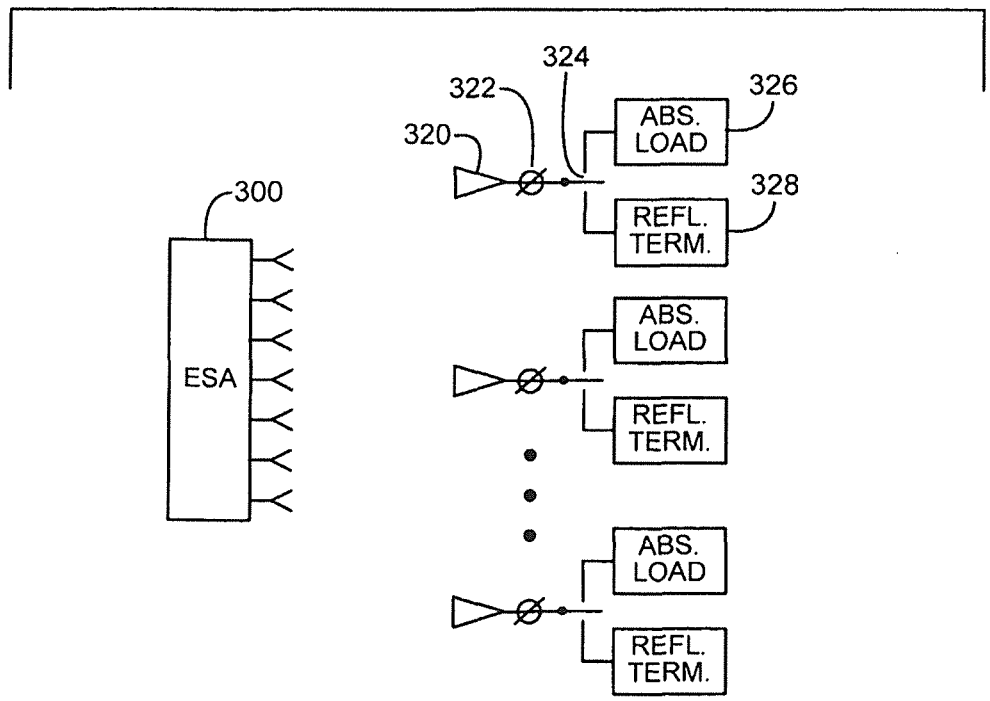

METHODS AND APPARATUS FOR DETERMINING PARAMETERS OF AN ARRAY

CROSS-REFERENCE TO RELATED APPLICATION(S)

This application is a divisional of U.S. patent application Ser. No. 12/660,227, entitled METHODS AND APPARATUS FOR DETERMINING PARAMETERS OF AN ARRAY, filed Feb. 23, 2010, the entire contents of which are incorporated herein by reference.

BACKGROUND

Large antennas are mounted on light-weight non-rigid structures can pose a number of significant challenges, including antenna shape distortion and transmit and receive channel propagation parameters. Non-rigid antennas can be distorted by numerous mechanical and thermal loads which may vary with time, possibly at high rate. Small distortions can significantly degrade the antenna performance. For example, a linear distortion of 3-cm across an X-band aperture displaces the beam by a full beamwidth; random distortions of less that 1-cm will destroy the beam quality. The electrical properties (phase and transit time) of the channels connecting the various elements of the antenna may change with time. Small uncompensated changes in phase and transit time can destroy the beam focus.

U.S. Pat. No. 6,954,173 describes techniques for measurement of deformation of electronically scanned antenna array structures.

SUMMARY OF THE DISCLOSURE

Methods for determining parameters for an array are described. An exemplary embodiment of a method determines a set of parameters for an antenna array including multiple array elements, the array being fed by a feed array including a plurality of feed elements. The embodiment of the method includes measuring a plurality of bistatic ranges Rijk through different signal path combinations, each signal path combination from a feed element "i," to an array element "j," and to a feed element "k". The measuring includes radiating energy from feed element "i", and reflecting some of the radiated energy from array element "j" back to feed element k of the feed array. The measured bistatic ranges are processed to solve for the set of parameters.

Another embodiment of a method is for measurement of multiple array elements of an array, and includes radiating energy from one or more array elements, reflecting some of the radiated energy from a set of reflector elements back to the array elements each reflector element having a variable phase shifter associated therewith, cycling each reflector element phase shifter through a range of phase shifter settings at a unique rate, processing the received signals to extract a phase of the reflected energy as received at each element; and using the extracted phase for each element to determine a relative location of each array element.

BRIEF DESCRIPTION OF THE DRAWINGS

FIG. 5 schematically illustrates an exemplary embodiment of a reflector which is fed by an array feed.

FIG. 6 schematically depicts an exemplary embodiment of an electronically scanned array and an arrangement of a plurality of retro-reflector devices.

DETAILED DESCRIPTION

Figure 1:
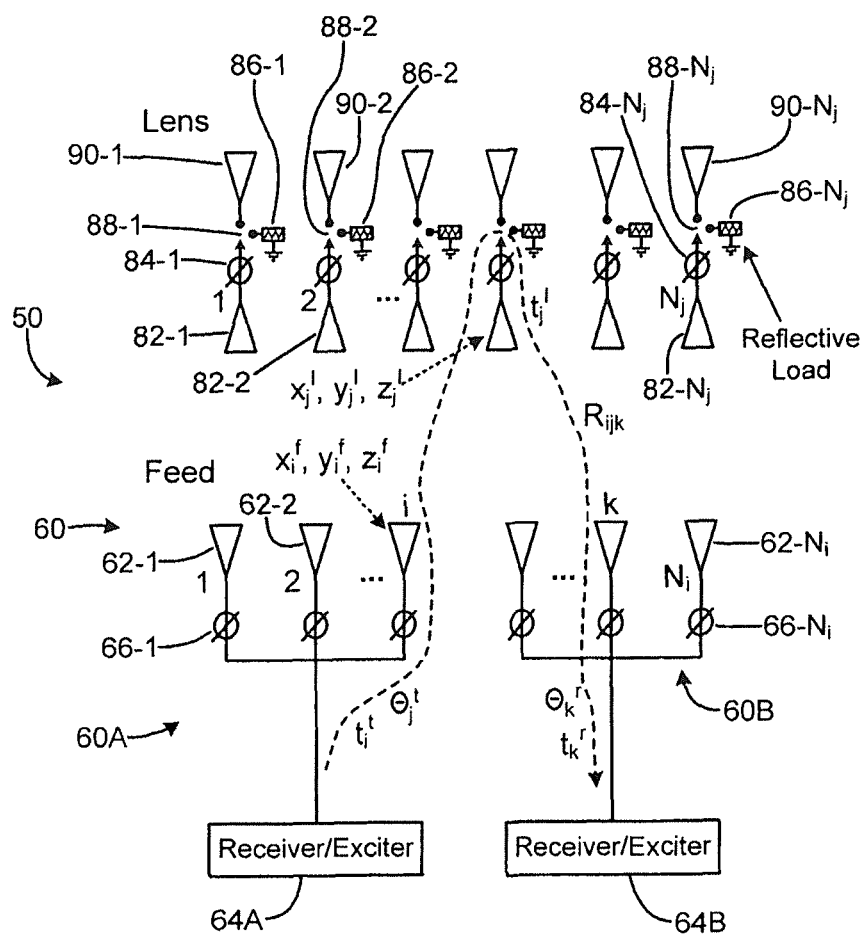
FIG. 1 is a schematic diagram of an exemplary embodiment of an array antenna including an array of feed elements which are grouped into subarrays, each subarray with its own exciter/receiver.

In the following detailed description and in the several figures of the drawing, like elements are identified with like reference numerals. The figures are not to scale, and relative feature sizes may be exaggerated for illustrative purposes.

Exemplary embodiments of a technique for calibrating antennas to compensate for physical distortion of the antenna shape as well as for variations in the properties of the electronic components are described. An exemplary embodiment of the calibration process may be executed at high rate (to accommodate rapidly varying antenna parameters) and with little interruption of the nominal operation of the antenna.

In an exemplary embodiment, array phase shifters may be used to introduce an element-unique code which can be decoded in the receiver to determine the locations and channel propagation parameters of the antenna components.

Degradation of beam quality due to antenna distortion and varying channel propagation parameters may be mitigated by applying a phase and/or time correction to the array or (in the case of array-fed reflectors) to the array feed. Proper selection of the correcting phase/time may involve only knowledge of the distortion and the channel propagation parameters. If accurate and timely knowledge of the distortion is available, the beam can be restored simply by making an appropriate electronic correction to the array elements.

Consider the array antenna 50 depicted in FIG. 1, including an array feed 60 of $N_i$ elements 62-1, 62-2 ... 62-$N_i$ grouped into subarrays 60A, 60B, each subarray with its own exciter/receiver 64A, and 64B. Each element 62-1, ... 62-$N_i$ has a respective phase shifter 66-1, ... 66-$N_i$ associated therewith. For the purpose of this initial discussion, assume further that the array feed 60 illuminates a space-fed lens 80 having $N_j$ elements 82-1, 82-2 ... 82-$N_j$, each with one of phase shifters 84-1, 84-2 ... 84-$N_j$ employed to steer the beam, and a radiating element 90-1, 90-2, ... 90-$N_j$. In addition, without loss of generality, assume that the phase shifters of each lens element may be switched between the respective radiating element and a reflective load or terminator 86-1, 86-2 ... 86-$N_j$ by switches 88-1, 88-2 ... 88-$N_j$.

In an exemplary embodiment, to generate a coherent beam in a desired direction, accurate knowledge may be obtained of the following:

Seven feed parameters for each feed element "i": element position $(x_i^f, y_i^f, z_i^f)$, transmit channel parameters (phase $\Theta_i^t$ and time delay $t_i^t$), and receive channel parameters (phase $\Theta_i^r$, and time delay $t_i^r$);

Five lens parameters for each lens element "j": element position ($x_j^1, y_j^1, z_j^1$), transmit channel parameters (phase $\Theta_j^1$ and time delay $t_j^1$)

With the above parameters, the array phase shifters and time-delay units (if available) can be adjusted to compensate for the distortion.

In an exemplary embodiment, to determine the desired feed and lens parameters, the bistatic range $R_{ijk}$ is measured from feed element "i," to lens element "j," and finally to feed element "k". The bistatic range is measured for a sufficient number of combinations of feed/element paths to solve for the unknown parameters. An exemplary process for deriving the parameters is the following.

Define a vector "V" of these unknown parameters for a feed of $N_i$ elements and lens of $N_j$ elements:

$$V = [F_1, \ldots, F_i, \ldots, F_{Ni}, L_i, \ldots, L_j, \ldots, L_{Nj}]$$

where $F_i$=position and electrical parameters of the $i^{th}$ feed element $$= [x_i^f, y_i^f, z_i^f, \Theta_i^t, t_i^t, \Theta_i^r, t_i^r]$$

$L_j$=position and electrical parameters of the $j^{th}$ lens element $$= [x_j^1, y_j^1, z_j^1, \Theta_j^1, t_j^1]$$

Define also a measurement vector M of the bistatic range measurements $$M = [R_{111}, \ldots, R_{ijk} \ldots],$$

and a matrix "G" defining the linearized geometric equations relating the measurements to the unknown parameters, $$M = G * V$$

These linearized equations may then be employed to determine the desired feed and lens parameters which yield the best RMS fit to the bistatic range measurements $$V_{rms} = (G^T W^{-1} G) H^T W^{-1} M$$

where W is the covariance of the measurement noise.

Following the above procedures, the desired feed and lens parameters (vector "V") can be derived from a suitable set of bistatic measurements. Once the parameters are known, they may be applied to determine the phase and time correction to be applied to each fed and lens element to focus the beam in a desired direction.

Figure 2:
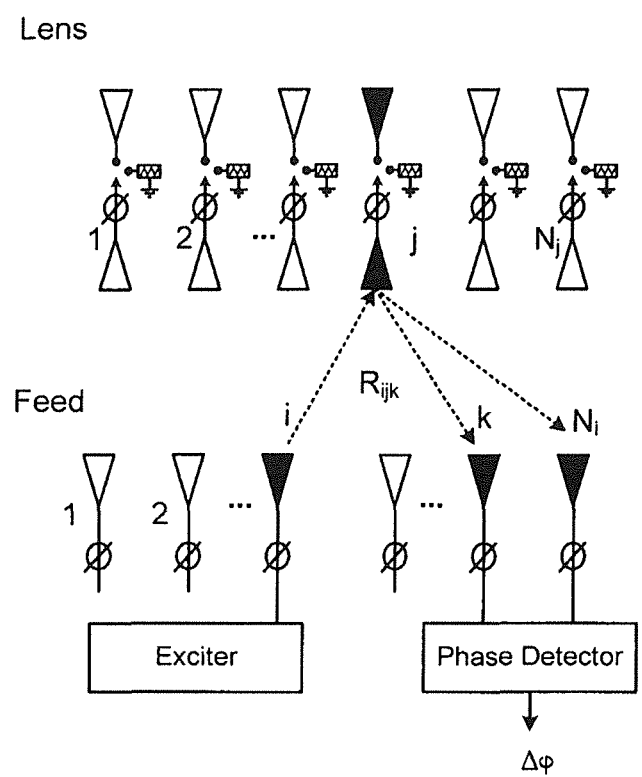
FIG. 2 is a schematic view illustrating an exemplary determination of a bistatic range $R_{ijk}$ by measuring the difference in the phase of the signal arriving at neighboring feed elements.

In an exemplary embodiment, the desired bistatic range $R_{ijk}$ may be determined by measuring the difference in the phase of the signal arriving at neighboring feed elements. An exemplary technique for accomplishing this is shown in FIG. 2. An arbitrary feed element "i" radiates a coherent signal that impinges on lens element "j". A portion of the energy incident on lens element j will enter the lens phase shifter and (when the terminator load is switched to be reflective) will scatter energy toward the feed. Some of this backscattered signal will impinge on feed elements "k" and reference element "$N_i$". The phase difference of signals received at elements k and $N_i$ is measured. The phase difference $\Delta\phi$ between the signal arriving at feed element k (bistatic path $R_{ijk}$) and $N_i$ (bistatic path $R_{ijNi}$) may be used to determine (Mod $\lambda$) the differential path length $\Delta P$ between the two paths as follows:

$$\Delta P = \lambda(\Delta\phi/2\Pi + N)$$

where the integer N (0, 1, 2, 3, . . . ) accounts for the ambiguity in translating the measured phase difference into a range difference.

In an exemplary embodiment, the translation of the position and electrical parameters into a bistatic range employs conversion of the electrical parameters ($\Theta$, t) to range R=c* (t+$\Theta$/2$\Pi$f), where c=speed of light and f=frequency of the signal. This translation is included in the G matrix. Note that the bistatic measurements can be taken at multiple frequencies (to increase the number of measurements). In addition, measurements at two frequencies may be employed to resolve ambiguity between time and phase.

The process of resolving the range ambiguity is commonly known as "phase unwrapping." Although the unwrapping process for some situations can be complex (or perhaps not even possible), it is easily accomplished in an exemplary application of interest here since the feed elements are closely spaced. Specifically, since adjacent elements are typically less than half-a-wavelength apart, the phase difference will be less than one wavelength. Thus, in this case, there is no ambiguity between adjacent elements. Although there is a potential for ambiguity between widely spaced elements, this ambiguity may be resolved by "walking along" a path of the elements which lie between the subject elements. Unwrapping in this fashion is easily accomplished and is routinely done for many applications, including terrain mapping with interferometric synthetic aperture radar data.

The phase measure process described above may typically be encumbered by two factors as follows:

1) Phase detector insertion. In order to measure the phase difference between neighboring feed elements, a phase detector may be connected to the output ports of each pair of elements of interest. If this were done in the conventional manner, an extensive network would be needed to connect all desired pairs of elements. Not only would such a network introduce complexity into the system, but in addition it might alter the phase and time delays associated with the various channels. Specifically, the path lengths of the network would likely differ from the path that the signal travels in propagating from the elements to the associated exciter or receiver.

2) Sequential measurement process. If the phase detector were sequentially cycled through each combination of pairs of feed elements, the process would likely take a long time and thus interfere with the normal operation of the antenna. A technique of measuring the phase of many (or all) elements simultaneously is desired.

Figure 3:
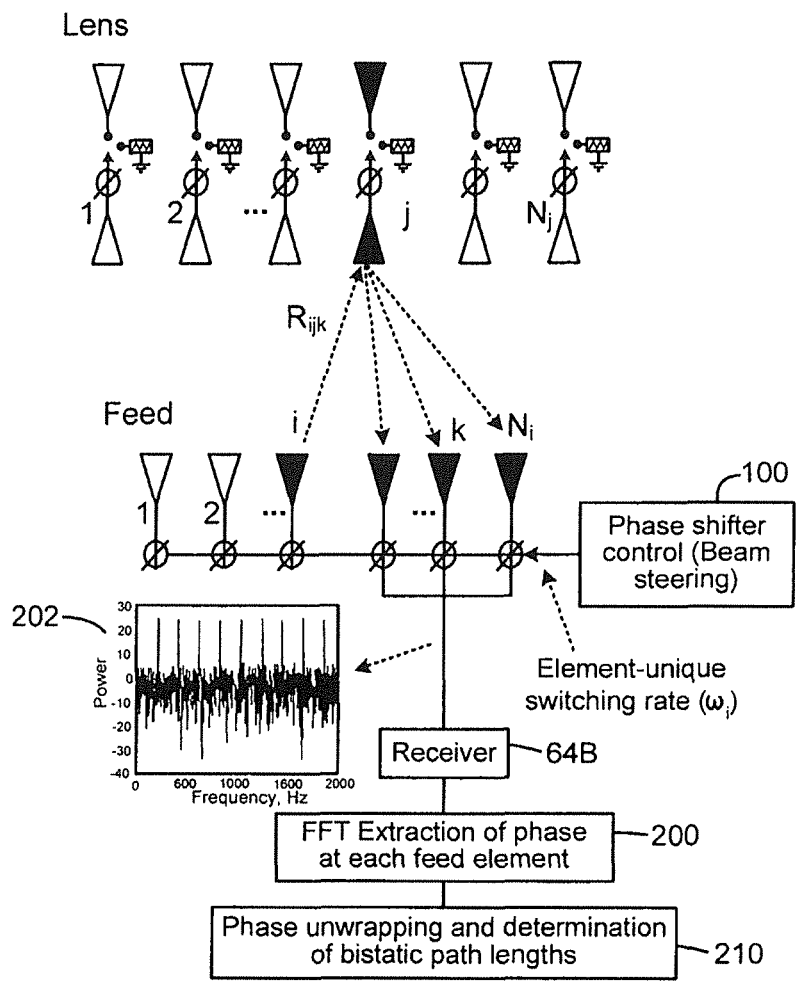
FIG. 3 is a schematic diagram illustrating an exemplary array antenna and an exemplary technique for measuring a large number of pairs of elements simultaneously, without a switching network.

FIG. 3 illustrates an exemplary technique for measuring a large number of pairs of elements simultaneously, without requiring a switching network. The technique employs the element phase shifters to inject an element-unique code which enables the processor to extract the desired phase for all pairs of elements simultaneously. The technique is as follows:

A single element (i in FIG. 3) of the feed emits a signal of specified frequency. This signal impinges on each lens element, enters the lens element phase shifter, is reflected from the termination, returns through the phase shifter, and back toward the feed array where it impinges on each of the feed receive elements.

The beam steering controller 100 directs the phase shifter associated with each receive feed element to change phase at an element-unique rate $\omega_i$. The phase switching of all elements is performed in unison at a rate $f_s$ at times $t=N/f_s$, where N=0, 1, 2, 3 . . . . At each switching time, the phase shifter associated with the $i^{th}$ element is set to .$\phi_i = \omega_i * N/f_s$. In the case of discrete phase shifters, the discrete value nearest the desired value is used.

The outputs from each array element are combined and fed to the receiver (64B in this example) via the conventional receive network.

The composite signal from the receiver is processed with an FFT 200 which generates a spectrum 202 with a series of peaks, each peak corresponding to one of the element-unique frequencies $\omega_i$ which were directed by the beam steering computer.

The phase of the signal received at each element is extracted from the FFT. At each frequency $\omega_i$, the phase of the received signal is computed as $$\Phi_i = \tan^{-1}(\text{Imag FFT}(\omega_i)/\text{Real FFT}(\omega_i))$$

The measured phases $\Phi_i$ of the feed elements are then unwrapped at 210 to determine the desired bistatic ranges, from which the element locations and channel propagation parameters are determined.

The discussion above tacitly assumes that the lens consists of a single element. Since the lenses of interest may have many elements, the returns from the multiple elements can conflict with the desired return from any single lens element. This can be avoided by switching the lens phase shifters at an element-unique rate (in addition to shifting the feed element phase shifters as discussed above.)

Figure 4A:
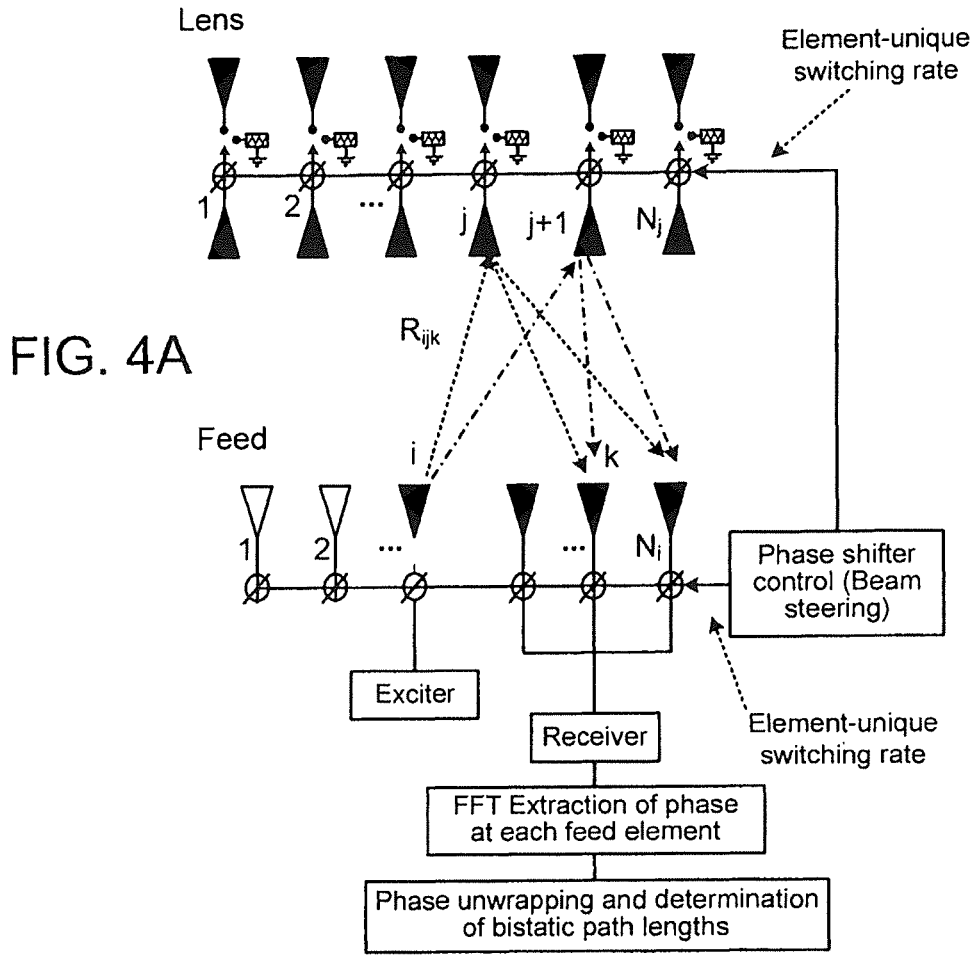
FIG. 4A is a schematic diagram of an exemplary array antenna and a measurement technique involving switching the lens phase shifters at an element-unique rate.
Figure 4B:
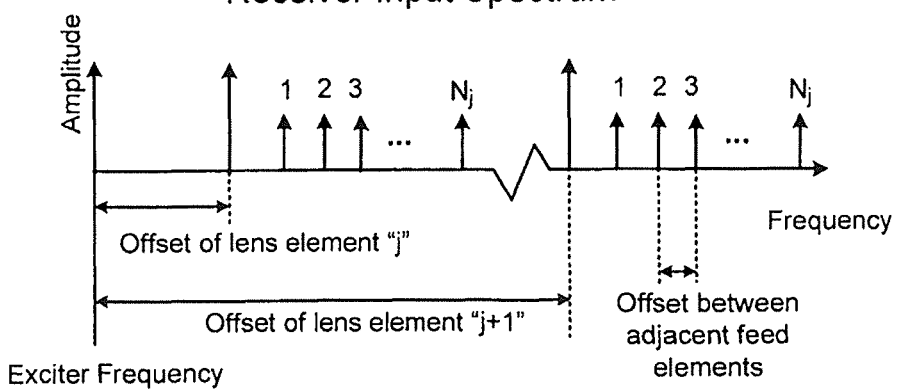
FIG. 4B shows an example spectrum in which the lens phase shifter rates are separated by a rate which exceeds the highest shifting rate of any of the feed elements.

FIGS. 4A-4B illustrate the concept. The beam steering controller directs the phase shifter associated with the "$j^{th}$" lens element to change phase at an element-unique rate $\omega_j$. As before, the beam steering controller also directs the phase shifter associated with the "$i^{th}$" feed element to change phase at an element-unique rate $\omega_i$. The set of feed shifter rates $\omega_i$ and lens shifter rates $\omega_j$ can be chosen to avoid overlaps. FIG. 4B shows an example spectrum in which the lens phase shifter rates are separated by a rate which exceeds the highest shifting rate of any of the feed elements. As shown in FIG. 4B, all desired tones are separated in the receiver spectrum. Thus the desired bistatic ranges $R_{ijk}$ can be isolated and determined.

The forgoing discussion focused on determining the bistatic range between a single transmit feed element and pairs of lens and feed receive elements. The concept can readily be extended to include additional transmit feed elements as well. This could be accomplished by using the beam steering controller to also direct the feed phase shifters to switch at a unique rate during transmit. By choosing appropriate shifting rates, overlaps in the receive spectrum can be avoided such that all combinations of lens, transmit feed, and receive feed elements can be measured.

The previously described exemplary embodiments employ passive elements which may be switched to a reflective terminator so as to reflect a phase-shifted signal. The concept can be extended to employ active devices which also amplify the signal. Such amplification may be of value to applications in which a strong return signal is desired.

The technique can be applied to array-fed reflectors. FIG. 5 schematically illustrates an exemplary embodiment of a reflector 200 which is fed by an array feed 60. In reflector applications, the reflector surface 210 can be populated by retro-reflector devices 220 which have a phase-shifter 222 and a switchable termination including a switch 224 selectively coupling the phase shifter to an absorptive load 226 or a reflective termination 228. The switchable termination provides two modes as follows:

Reflective mode, with the switch 224 connecting the reflective termination to the phase shifter 222, in which the incident energy from the feed 60 is passed through the phase shifter 222 and then directed back toward the feed 60. By changing the phase shifter at a unique rate, the bistatic path can be detected and uniquely identified in the receiver. In this manner the location of the phase center of the device can be determined using the processes described above. This phase center will be directly related to the reflector surface on which the device is mounted.

Passive mode, with the switch 224 connecting the absorptive load to the phase shifter, in which the incident energy for the feed 60 is absorbed for the most part. This mode is used during nominal operation of the antenna to assure that the calibration signals do not interfere with the nominal functions.

The technique can be applied to conventional electronically scanned arrays (ESAs) as well. FIG. 6 schematically depicts an exemplary embodiment of an ESA 300 and an arrangement of a plurality of retro-reflector devices 320, each connected to a phase shifter 322, in turn selectively connected by a switch 324 to an absorptive load or a reflective termination 328. By placing the retro-reflector devices 320 within the field-of-view of the ESA, the ESA can use the devices to determine the positions of its array elements and their associated channel propagation parameters, using the techniques described above with respect to FIGS. 1-4B. The locations of these reflectors does not need to be known (the locations are derived in the process).

The use of bistatic range measurements to determine the locations of the desired array elements has been described above. It should be noted that measurements of one-way range differences between an element and a reference element such as a coherent source or sources could as well be sufficient to locate the desired elements. The technique is capable of self-surveying the coherent sources and array elements when a sufficient number of coherent sources are within the antenna's field-of-view. Specifically, the redundancy in coherent sources enables their location to be determined along with the locations of the desired array elements.

The discussions above have addressed the problem of determining the relative locations of the array elements, lens elements, and reflector surface relative to each other. Knowledge of these relative locations is sufficient to form a coherent beam, although it is not sufficient to determine the direction of the beam.

In order to determine the direction of the beam, the relative locations are translated into a coordinate system common to the target. This can be accomplished by selecting some appropriate elements to serve as reference elements whose locations are known in a coordinate system common to the target. In the case of a three-dimensional scanning antenna, knowledge of the locations of three suitable elements is adequate to establish this relationship.

The techniques described above are equally applicable to transmit and receive antennas.

Exemplary techniques for calibrating antennas to compensate for physical distortion of the antenna shape as well as for variations in the properties of the antenna's electronic components have been described. The calibration process can be executed at high rate (to accommodate rapidly varying antenna parameters) and with little interruption to the normal operation of the antenna.

Exemplary embodiments of the techniques described herein eliminate the dependence on precisely located coherent sources. This is accomplished by making a sufficient number of bistatic (or one-way) range measurements between various elements of the antenna such that the elements can be "self-located."

Exemplary features of the techniques may include one or more of the following:

1) Use of the antenna's existing components (phase shifter, phase shifter controller, transmitter, and receiver) to implement the calibration process.

2) Use of a unique switching frequency for each array element which enables the system to simultaneously measure the desired parameters of all components.

3) Ability to measure all components sufficiently fast to be useful for antennas which experience rapidly changing parameters.

4) Does not require coherent sources at accurately surveyed locations.

5) May be applied to principal types of antennas, including conventional planar ESAs, array-fed lens antennas, array-fed reflector antennas, and conventional reflector antennas.

Although the foregoing has been a description and illustration of specific embodiments of the subject matter, various modifications and changes thereto can be made by persons skilled in the art without departing from the scope and spirit of the subject matter.

What is claimed is:

1. A method for determining a set of parameters for an antenna array including multiple array elements, the array being fed by a feed array including a plurality of feed elements, the method comprising:

measuring a plurality of bistatic ranges $R_{ijk}$ through different signal path combinations, each signal path combination from a feed element "i," to an array element "j," and to a feed element "k", said measuring including radiating energy from feed element "i", and reflecting some of the radiated energy from array element "j" back to feed element k of the feed array;

processing the measured bistatic ranges to solve for the set of parameters.

2. The method of claim 1, wherein the set of parameters includes position parameters for each feed element and each array element.

3. The method of claim 1, wherein the set of parameters includes electrical parameters for each feed element and each array element.

4. The method of claim 1, wherein the feed array includes a set of feed array phase shifters each connected to a respective feed radiator element, and wherein said measuring said plurality of bistatic ranges $R_{ijk}$ further comprising: cycling each feed array phase shifter through a range of phase shifter settings at an element-unique rate $\omega_i$.

5. The method of claim 4, wherein said measuring said plurality of bistatic ranges $R_{ijk}$ further includes:

combining the phase shifted signals from each feed element to provide a composite signal;

processing the composite signal to extract a phase of the reflected energy as received at each element; and using the extracted phase for each element to determine said plurality of bistatic ranges $R_{ijk}$.

6. The method of claim 4, wherein the array includes a set of array element phase shifters each connected to a respective array element, and wherein said measuring said plurality of bistatic ranges $R_{ijk}$ further comprising:

cycling each array element phase shifter through a range of phase shifter settings at an element-unique rate $\omega_j$.

7. A method for determining a set of parameters for an array including multiple array elements, each array element, the array being fed by a feed array including a plurality of feed elements, the method comprising:

(A) measuring a bistatic range $R_{ijk}$ through a signal path from feed element "i," to array element "j," and to feed element "k", including radiating energy from one of the feed radiator elements, and reflecting some of the radiated energy from a set of the array elements back to respective feed elements of the feed array;

(B) repeating step A to measure the bistatic ranges $R_{ijk}$ for a plurality of different respective signal paths of different combinations of feed elements and array elements;

(C) using the measured bistatic ranges to solve for the set of parameters.

8. The method of claim 7, wherein said step A of measuring a bistatic range comprises:

measuring differences in the phase of the reflected signals received at the respective feed elements of the feed array.

9. The method of claim 7, wherein the set of parameters include respective feed element positions and respective array element positions.

10. The method of claim 7, wherein the feed array includes a set of feed array phase shifters each connected to a respective feed radiator element, the step (A) of the method further comprising:

cycling each feed array phase shifter through a range of phase shifter settings at an element-unique rate $\omega_i$.

11. The method of claim 10, wherein the multiple array elements comprise elements of a lens array, each element having a radiator element positioned to receive energy from the feed array, a lens element phase shifter, a radiating element to radiate to the lens array far field, and a switch arranged to selectively connect a port of the lens element phase shifter between the radiating element and a reflective termination, and wherein:

said reflecting some of said radiated energy comprises setting said switches to said reflective load so that energy received at the respective radiator elements of said lens array passes through the respective lens element phase shifters and is reflected by the reflective load to pass through the respective lens element phase shifters again and is radiated from said respective radiator elements toward said feed array.

12. The method of claim 11, wherein said step (A) further comprises:

cycling each lens element phase shifter through a range of phase shifter settings at an element-unique rate $\omega_j$.

13. The method of claim 7, wherein each array element comprises a retro reflector element positioned to receive energy from the feed array, a reflector phase shifter, and a switch arranged to selectively connect a port of the reflector element phase shifter between an absorptive load and a reflective termination, and wherein:

said reflecting some of said radiated energy comprises setting said switches to said reflective termination so that energy received at the respective retroreflector elements passes through the respective reflector phase shifters and is reflected by the reflective termination to pass through the respective reflector phase shifters again and is directed from said respective reflector elements toward said array.

14. The method of claim 13, further comprising: cycling each reflector element phase shifter through a range of phase shifter settings at an element-unique rate.

15. The method of claim 13, wherein the retro reflector elements are positioned on a reflector surface.

* * * * *